(12) United States Patent
Miyahara et al.

(10) Patent No.: US 10,120,216 B2
(45) Date of Patent: Nov. 6, 2018

(54) APPARATUS AND METHOD FOR MANUFACTURING DISPLAY DEVICE

(71) Applicant: KABUSHIKI KAISHA TOSHIBA, Minato-ku (JP)

(72) Inventors: Takahide Miyahara, Kanagawa-ken (JP); Takeshi Morita, Kanagawa-ken (JP); Kentaro Miyazaki, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 724 days.

(21) Appl. No.: 14/027,715

(22) Filed: Sep. 16, 2013

(65) Prior Publication Data

US 2014/0283366 A1 Sep. 25, 2014

(30) Foreign Application Priority Data

Mar. 22, 2013 (JP) .................................. 2013-061156

(51) Int. Cl.
*B29C 65/14* (2006.01)
*G02F 1/13* (2006.01)

(52) U.S. Cl.
CPC ....... *G02F 1/1303* (2013.01); *Y10T 29/49998* (2015.01)

(58) Field of Classification Search
CPC ......... G02F 1/1303; G02F 1/1333; G09F 9/00
(Continued)

(56) References Cited

U.S. PATENT DOCUMENTS 4,639,237 A * 1/1987 Fukuda ................. F16D 3/56
464/65.1
6,193,804 B1 * 2/2001 Chang .................. C23C 14/564
118/715
(Continued)

FOREIGN PATENT DOCUMENTS

CN 1441294 A 9/2003
CN 1458548 A 11/2003
(Continued)

OTHER PUBLICATIONS

JP 2001054890 English abstract, Feb. 2001.*
(Continued)

*Primary Examiner* — Michael N Orlando
*Assistant Examiner* — Elizabeth Bradford
(74) *Attorney, Agent, or Firm* — Oblon, McClelland, Maier & Neustadt, L.L.P.

(57) ABSTRACT

According to one embodiment, an apparatus for manufacturing a display device, includes: a first holding section configured to hold a first substrate; a second holding section configured to hold a second substrate; a turning section configured to turn the first holding section such that the first substrate and the second substrate face each other; a support section configured to support the first holding section after the turning; an adjustment section; and an elevation section. The adjustment section is provided at an upper end of the support section and is configured to adjust a distance between the first holding section after the turning and the upper end of the support section. The elevation section is configured to elevate the second holding section and attach the first substrate and the second substrate via an adhesive layer.

13 Claims, 3 Drawing Sheets

(58) Field of Classification Search
USPC .................................................. 156/275.5
See application file for complete search history.

(56) References Cited

U.S. PATENT DOCUMENTS 8,622,111 B1 * 1/2014 Lee .................. B32B 41/00
156/103
2011/0177261 A1 7/2011 Ishii et al.

FOREIGN PATENT DOCUMENTS

| CN | 1841167 A | | 10/2006 |
|---|---|---|---|
| CN | 102129134 A | | 7/2011 |
| JP | 2001054890 A | * | 2/2001 |
| JP | 2002-131762 A | | 5/2002 |
| JP | 2003-322834 A | | 11/2003 |
| JP | 2004-226689 A | | 8/2004 |
| JP | 2007-34329 | | 2/2007 |
| JP | 2007-156103 | | 6/2007 |
| JP | 2009-237287 A | | 10/2009 |
| JP | 2010-2851 A | | 1/2010 |
| JP | 2011-67802 A | | 4/2011 |
| JP | 2011-107228 | | 6/2011 |
| JP | 2011-145534 A | | 7/2011 |
| JP | 2011-150332 A | | 8/2011 |
| JP | 2011-170831 | | 9/2011 |
| TW | 200415386 | | 8/2004 |
| WO | WO 2009/060855 A1 | | 5/2009 |

OTHER PUBLICATIONS

JP 2009237287 English abstract, Oct. 2009.*
JP 2009237287 English machine translation, Oct. 2009.*
Office Action dated Jan. 12, 2016 in Korean Patent Application No. 10-2014-0020381 with English translation.
Office Action dated Jul. 6, 2015 in Taiwanese Patent Application No. 103106112 (with English translation).
Korean Office Action dated Aug. 30, 2016 in Patent Application No. 10-2014-0020381 (with English translation).
Japanese Office Action dated Aug. 31, 2016 in Patent Application No. 2013-061156 (with English translation).
Combined Chinese Office Action and Search Report dated Apr. 25, 2016 in Patent Application No. 201410072148.6 (with English language translation).

* cited by examiner

APPARATUS AND METHOD FOR MANUFACTURING DISPLAY DEVICE

CROSS-REFERENCE TO RELATED APPLICATIONS

This application is based upon and claims the benefit of priority from Japanese Patent Application No.2013-061156, filed on Mar. 22, 2013; the entire contents of which are incorporated herein by reference.

FIELD

Embodiments described herein relate generally to a apparatus and a method for manufacturing display device.

BACKGROUND

In a process of manufacturing a display device, there is a process of attaching two substrates with an adhesive agent. An adhesion apparatus used in the process has been proposed.

Here, in the display device, a functional member such as a touch switch or the like between the two substrates is provided to provide multiple functions, or a further slim structure is provided.

DETAILED DESCRIPTION

Figure 1:
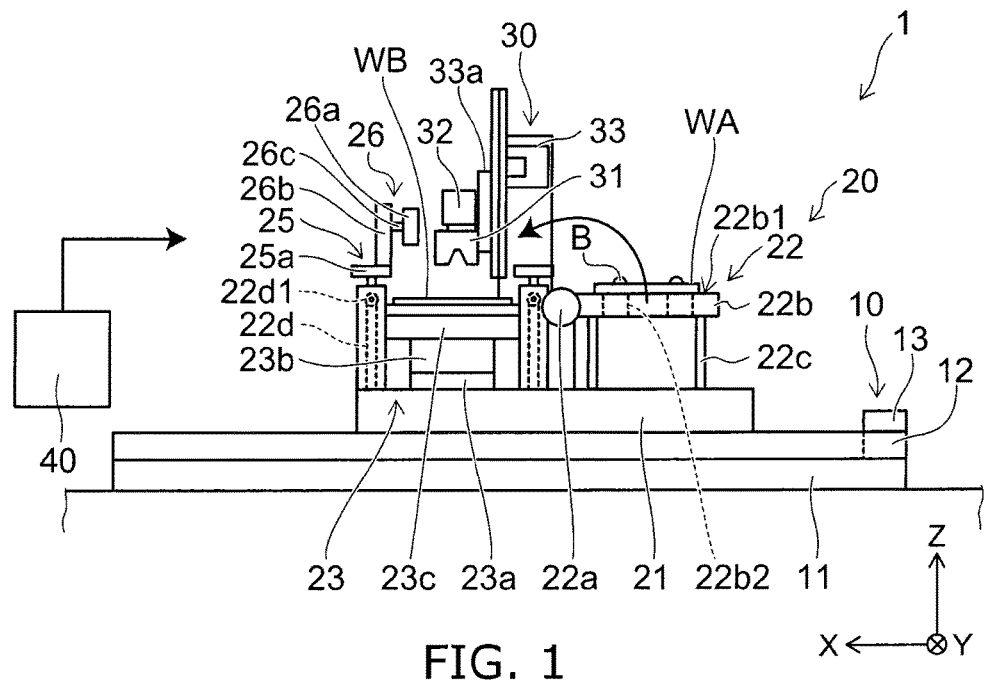
FIGS. 1 and 2 are schematic views for exemplifying an apparatus for manufacturing a display device according to an embodiment.

In general, according to one embodiment, an apparatus for manufacturing a display device, includes: a first holding section configured to hold a first substrate; a second holding section configured to hold a second substrate; a turning section configured to turn the first holding section such that the first substrate and the second substrate face each other; a support section configured to support the first holding section after the turning; an adjustment section provided at an upper end of the support section and configured to adjust a distance between the first holding section after the turning and the upper end of the support section; and an elevation section configured to elevate the second holding section and attach the first substrate and the second substrate via an adhesive layer.

Hereinafter, an embodiment will be exemplarily described with reference to the accompanying drawings. In addition, in the drawings, like components are designated by like reference numerals, and detailed description thereof will be omitted.

In addition, arrows X, Y and Z in the respective drawings represent three perpendicular directions, and for example, the arrows X and Y represent horizontal directions and the arrow Z represents a vertical direction.

Further, an apparatus 1 for manufacturing a display device and a method of manufacturing a display device according to the embodiment, the display device may have a pair of substrates facing each other. For example, the display device is a liquid crystal display device, an organic electro luminescence (EL) display device, or the like. In addition, a substrate WA (corresponding to an example of a first substrate) and a substrate WB (corresponding to an example of a second substrate), which will be described below, are for example a cover glass, a sensor glass, a liquid crystal module, an electro luminescence (EL) module, and so on.

Figure 2:
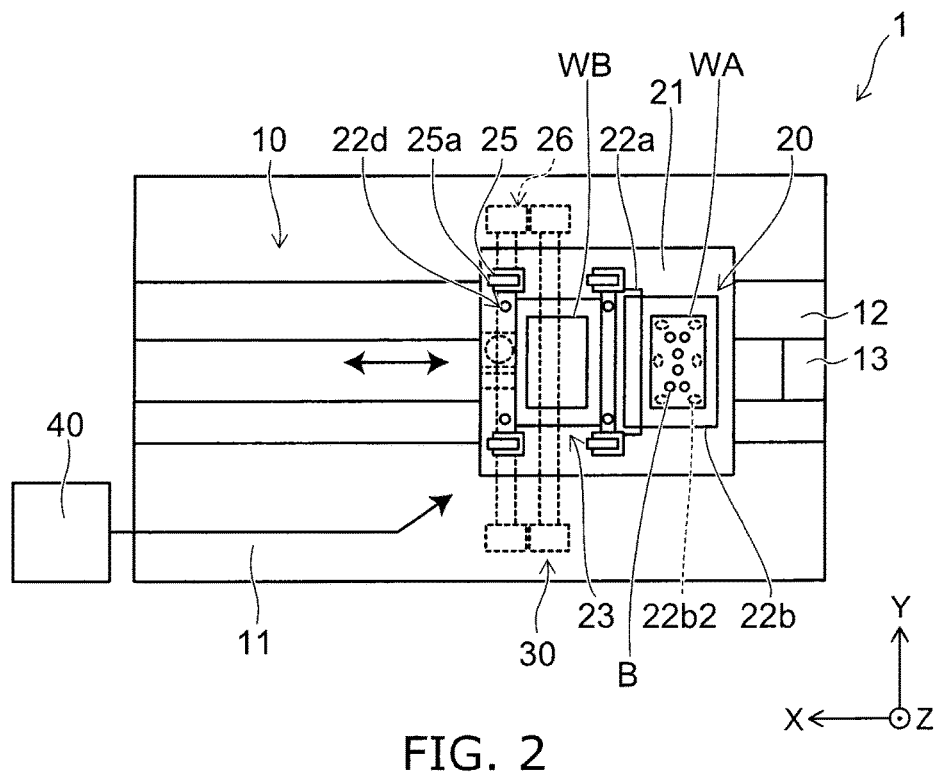

FIGS. 1 and 2 are schematic views for exemplifying the apparatus 1 for manufacturing the display device according to the embodiment.

In addition, FIG. 1 is a side view of the apparatus 1 for manufacturing the display device, and FIG. 2 is a plan view of the apparatus 1 for manufacturing the display device.

Figure 3:
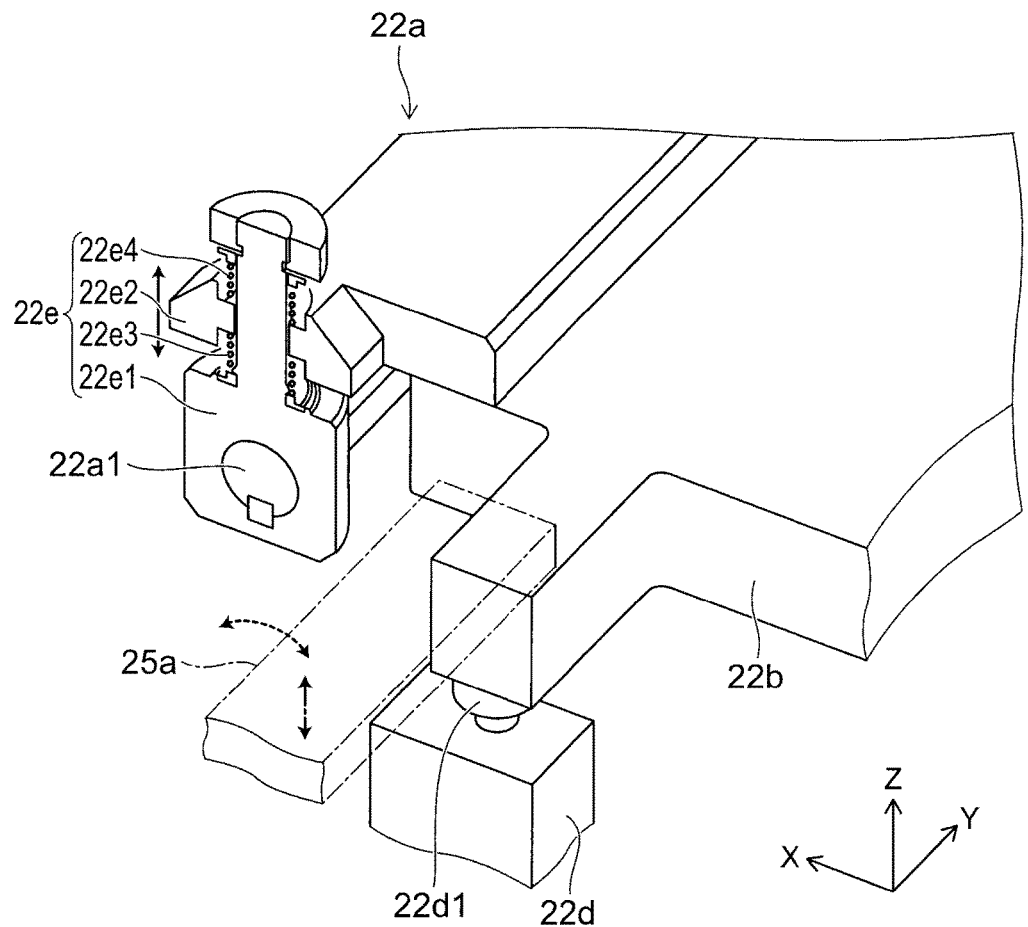
FIG. 3 is a schematic cross-sectional perspective view illustrating a floating section.

FIG. 3 is a schematic cross-sectional perspective view illustrating a floating section 22e.

Figure 4:
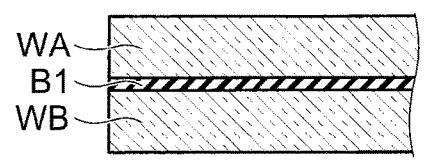
FIG. 4 is a schematic view illustrating a state in which substrates are adhered via an adhesive layer.

FIG. 4 is a schematic view illustrating a state in which the substrate WA and the substrate WB are adhered via the adhesive layer B1.

As shown in FIGS. 1 and 2, a moving unit 10, a panel alignment unit 20, a detection unit 30, and a control unit 40 are provided in the apparatus 1 for manufacturing the display device.

A base 11, a guide section 12, and a drive unit 13 are provided in the moving unit 10.

The base 11 is attached to a surface.

The guide section 12 is provided on an upper surface of the base 11. The guide section 12 guides movement in an X direction of the panel alignment unit 20.

The drive unit 13 is provided on the upper surface of the base 11. The drive unit 13 performs movement in the X direction of the panel alignment unit 20.

A base section 21, a substrate inversion section 22, a substrate placing section 23, a pressing section 25 and a radiation section 26 are provided in the panel alignment unit 20.

The base section 21 is provided at the guide section 12 to be movable in the X direction by the guide section 12 and the drive unit 13.

The substrate inversion section 22 inverts the placed substrate WA to hold the substrate placing section 23 thereon.

A turning section 22a, a substrate holding section 22b (corresponding to an example of a first holding section), a support section 22c, a support section 22d and the floating section 22e are provided in the substrate inversion section 22.

The turning section 22a is provided at the base section 21. The turning section 22a holds a side of one end section of the substrate holding section 22b and turns the substrate holding section 22b. That is, the turning section 22a turns the substrate holding section 22b such that the substrate WA and the substrate WB face each other.

The substrate holding section 22b holds the substrate WA placed on a placing surface 22b1. The holding of the substrate WA can be performed by adsorption using, for example, a vacuum pump or the like (not shown).

In addition, a hole section 22b2 passing in a thickness direction is formed in the substrate holding section 22b. When the hole section 22b2 is formed, as will be described below, it is possible to easily radiate ultraviolet rays to an adhesive layer B1 (see FIG. 4) formed between the substrate WA and the substrate WB or detect a recognition section for matching positions provided on the substrate WA and the substrate WB.

Further, the adhesive layer B1 may be formed by curing an adhesive agent (an ultraviolet ray curing adhesive agent) including an ultraviolet ray curing resin.

The support section 22c has a columnar shape, and supports the substrate holding section 22b before the turning.

As the substrate holding section 22b before the turning comes in contact with an upper end of the support section 22c, positioning in a vertical direction (a Z direction) of the substrate holding section 22b can be performed.

The number of disposed support sections 22c is not particularly limited. For example, the support sections 22c can be formed around four corners of the substrate holding section 22b. Accordingly, positional accuracy of the substrate holding section 22b in the Z direction on a horizontal surface can be improved.

The support section 22d has a columnar shape, and supports the substrate holding section 22b after the turning.

The number of disposed support sections 22d is not limited. For example, the support sections 22d can be formed around four corners of the substrate holding section 22b. Accordingly, positional accuracy of the substrate holding section 22b in the Z direction on a horizontal surface can be improved.

Here, when the placing surface 22b1 of the substrate holding section 22b after the turning is not parallel to an upper surface of the substrate placing section 23, control of the thickness dimension of the adhesive layer B1, which will be described below, becomes difficult.

For this reason, in the apparatus 1 for manufacturing the display device according to the embodiment, as shown in FIG. 3, an adjustment section 22d1 is provided at an upper end of the support section 22d, and a distance between the substrate holding section 22b after the turning and the upper end of the support section 22d can be adjusted.

For example, the adjustment section 22d1 may be a screw mechanism provided at the upper end of the support section 22d and configured to perform adjustment in the Z direction, or a thin spacer having high accuracy and disposed therebetween to perform adjustment in the Z direction.

As shown in FIG. 3, the floating section 22e is provided between the turning section 22a and the substrate holding section 22b.

A shaft section 22e1, a plate section 22e2 and elastic sections 22e3 and 22e4 are provided at the floating section 22e.

A turning shaft 22a1 of the turning section 22a is fixed to one end side of the shaft section 22e1. The other end side of the shaft section 22e1 passes through the plate section 22e2 and protrudes from the plate section 22e2.

The shaft section 22e1 is inserted through one end side of the plate section 22e2, and an end section of the substrate holding section 22b is fixed to the other end side of the plate section 22e2. A small gap is formed between the plate section 22e2 and the shaft section 22e1, and the plate section 22e2 can move along the shaft section 22e1.

The elastic sections 22e3 and 22e4 are provided to sandwich the plate section 22e2. The elastic sections 22e3 and 22e4 may be, for example, compression springs or the like.

A position of the plate section 22e2 with respect to the shaft section 22e1 is varied according to a position at which the substrate holding section 22b comes in contact with the support section 22d via the adjustment section 22d1. Here, a variation in a dimension of the position of the plate section 22e2 can be absorbed by the elastic sections 22e3 and 22e4.

The substrate placing section 23 is provided at a position corresponding to a lower side of the substrate holding section 22b after the turning.

The substrate placing section 23 raises the placed substrate WB and attaches the substrate WB and the substrate WA held on the substrate holding section 22b. Here, the substrate placing section 23 is controlled such that the thickness dimension of the adhesive layer B1 is within a predetermined range.

A position control unit 23a, an elevation section 23b and a holding section 23c (corresponding to an example of a second holding section) are provided at the substrate placing section 23.

The position control unit 23a is provided on the base section 21 and performs position control on the holding section 23c. The position control unit 23a performs position control in the X direction, Y direction, Z direction and θ direction (rotation direction). The position control unit 23a may be configured by providing a Z table provided on an XYθ table.

The elevation section 23b is provided on the position control unit 23a. The elevation section 23b raises the holding section 23c and attaches the substrate WA and the substrate WB via the adhesive layer B1.

The holding section 23c is provided on the elevation section 23b. The holding section 23c holds the placed substrate WB. The holding of the substrate WB may be performed by absorption using, for example, a vacuum pump (not shown).

The pressing section 25 presses the substrate holding section 22b after the turning from an upper side toward the support section 22d. Then, the support section 22d and the pressing section 25 cooperate to maintain the position of the substrate holding section 22b after the turning.

As shown in FIG. 3, when the substrate holding section 22b after the turning is pressed, a claw 25a is lowered from the upper side of the support section 22d, and the substrate holding section 22b is pressed from the upper side. As the substrate holding section 22b is pressed by the claw 25a, the position of the substrate holding section 22b after the turning can be maintained. In addition, when the substrate holding section 22b is turned, the claw 25a is retracted from the upper side of the support section 22d.

The pressing section 25 may be, for example, a turning type clamp unit including an air cylinder and a cam.

When the substrate WB is raised by the substrate placing section 23 to attach the substrate WA and the substrate WB, a force in a direction in which the substrate holding section 22b after the turning is raised is generated. When the position of the substrate holding section 22b after the turning is varied by the force, accuracy of the thickness dimension of the adhesive layer B1 is degraded.

For this reason, in the apparatus 1 for manufacturing the display device according to the embodiment, the pressing section 25 is provided to maintain the position of the substrate holding section 22b after the turning.

The radiation section 26 radiates the ultraviolet rays toward the adhesive layer B1 formed between the substrate WA and the substrate WB via the hole section 22b2 formed in the substrate holding section 22b.

As described below, the radiation section 26 radiates the ultraviolet rays to a partial region of the adhesive layer B1.

A radiation head 26a and a moving unit 26b are provided at the radiation section 26.

For example, the radiation head 26a may include a lamp, a light emitting device, or the like, configured to radiate ultraviolet rays.

The moving unit 26b is provided on the base 11 to cross the base section 21 in the Y direction.

The moving unit 26b has a guide section 26c, which is movable in the Y direction, and the radiation head 26a is provided at the guide section 26c. In addition, the radiation head 26a can be moved in the Y direction by a drive unit (not shown) via the guide section 26c.

The detection unit 30 performs measurement of the thickness dimensions of the substrate WA and the substrate WB, and detection of positions of the substrate WA and the substrate WB.

A measurement unit 31, an imaging unit 32, and a moving unit 33 are provided in the detection unit 30.

The measurement unit 31 performs measurement of the thickness dimension of the substrate WA held on the substrate holding section 22b, and measurement of the thickness dimension of the substrate WB held on the holding section 23c.

The measurement unit 31 may be, for example, a laser displacement meter or the like.

Information related to the thickness dimensions of the substrate WA and the substrate WB measured by the measurement unit 31 is transmitted to the control unit 40 and used to control the thickness dimension of the adhesive layer B1.

The imaging unit 32 images recognition sections (for example, alignment marks, shapes of corner portions, or the like) formed on the substrate WA and the substrate WB.

The imaging unit 32 may be a charge coupled device (CCD) or the like.

The positional information related to the substrate WA and the substrate WB imaged by the imaging unit 32 is transmitted to the control unit 40, and image processing is performed to calculate a positional deviation amount. The calculated positional deviation amount is used in the positional control of the substrate WB by the position control unit 23a.

In addition, the imaging by the imaging unit 32 can be performed via the hole section 22b2 formed in the substrate holding section 22b.

Further, when the hole section 22b2 is unnecessarily large and the substrate holding section 22b is pressed, the substrate holding section 22b or the substrate itself is bent, and accuracy in the thickness dimension of the adhesive layer B1 is degraded. For this reason, in the apparatus 1 for manufacturing the display device according to the embodiment, the size of the hole section 22b2, which is a hole for radiating the ultraviolet rays and for performing the imaging, is set to a necessary minimum value.

The moving unit 33 is provided on the base 11 to cross the base section 21 in the Y direction. The moving unit 33 has a guide section 33a, which is movable in the Y direction, and the measurement unit 31 and the imaging unit 32 are provided at the guide section 33a. In addition, the measurement unit 31 and the imaging unit 32 can be moved in the Y direction by a drive unit (not shown) via the guide section 33a.

Further, an adhesive agent supply apparatus (not shown) configured to supply an adhesive agent B can be provided on a surface of the substrate WA held on the substrate holding section 22b before the turning.

However, the adhesive agent supply apparatus (not shown) may be provided separately from the apparatus 1 for manufacturing the display device to improve processing capability of the apparatus 1 for manufacturing the display device as well as productivity of the display device.

The control unit 40 controls operations of the respective components provided at the apparatus 1 for manufacturing the display device.

The control unit 40 controls, for example, movement of the position in the X direction of the panel alignment unit 20 by the drive unit 13, the holding of the substrate WA by the substrate holding section 22b, the turning of the substrate holding section 22b by the turning section 22a, the elevation (movement in the Z direction) of the substrate WB by the elevation section 23b, the holding of the substrate WB by the holding section 23c, the pressing of the substrate holding section 22b by the pressing section 25, the radiation of the ultraviolet rays by the radiation head 26a, movement of the position in the Y direction of the radiation head 26a by the moving unit 26b, measurement of the thickness dimension by the measurement unit 31, the imaging of the recognition section by the imaging unit 32, and so on.

Here, the control unit 40 controls the elevation section 23b based on information from the measurement unit 31 such that the thickness dimension of the adhesive layer B1 is within a predetermined range. For example, based on the thickness dimension of the substrate WA and the thickness dimension of the substrate WB, a raising amount by the elevation section 23b is controlled such that the thickness dimension of the adhesive layer B1 is within a predetermined range. In addition, details of control of the thickness dimension of the adhesive layer B1 will be described later. Further, the control unit 40 controls the position control unit 23a based on the information from the imaging unit 32, and matches the position in the XYZθ direction of the substrate WB with the position in the XYZθ direction of the substrate WA.

Next, a method of manufacturing a display device will be exemplarily described with operations of the apparatus 1 for manufacturing the display device according to the embodiment.

Figure 5:
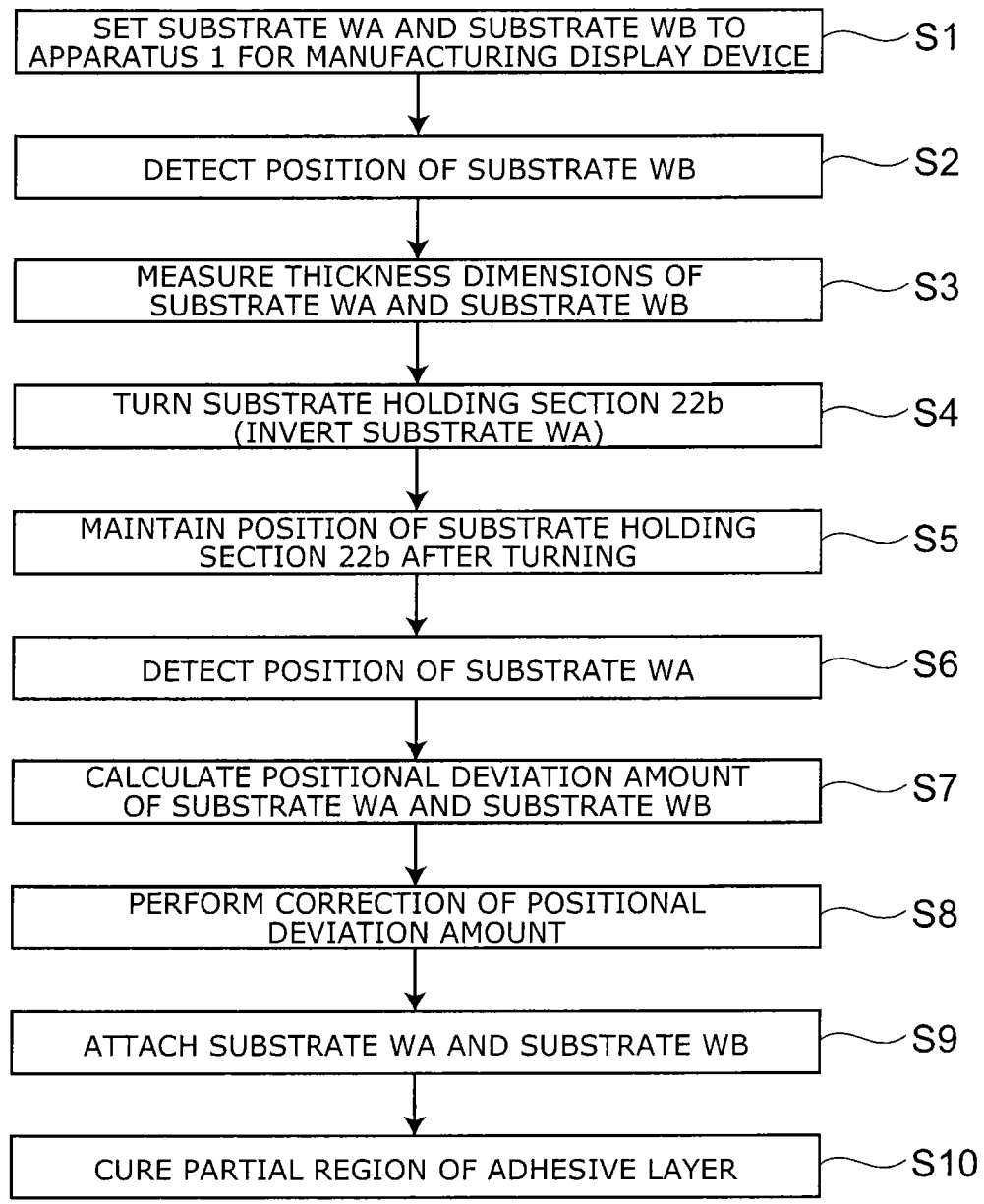
FIG. 5 is a flowchart illustrating operations of the apparatus for manufacturing the display device and a method of manufacturing the display device.

FIG. 5 is a flowchart illustrating operations of the apparatus 1 for manufacturing the display device and the method of manufacturing the display device.

As shown in FIG. 5, first, in step S1, the substrate WA and the substrate WB are set to the apparatus 1 for manufacturing the display device.

For example, the substrate WA is placed on the substrate holding section 22b and the substrate WB is placed on the holding section 23c.

In addition, the adhesive agent B is applied on a surface of the substrate WA in a droplet shape. The adhesive agent B may be applied by an adhesive agent application apparatus, which is separately provided and not shown.

The adhesive agent B may be an adhesive agent (an ultraviolet ray curing adhesive agent) including an ultraviolet ray curing resin.

The substrate WA is placed such that a surface opposite to a surface on which the adhesive agent B is applied is directed toward the substrate holding section 22b.

Next, the substrate WA is held on the substrate holding section 22b and the substrate WB is held on the holding section 23c.

Next, in step S2, a position of the substrate WB is detected.

For example, movement in the X direction of the panel alignment unit 20 (the substrate WB) is performed by the drive unit 13, movement in the Y direction of the imaging unit 32 is performed by the moving unit 33, and a recognition section formed on the substrate WB is imaged by the imaging unit 32.

Next, in step S3, the thickness dimensions of the substrate WA and the substrate WB are measured.

For example, measurement of the thickness dimension of the substrate WA held on the substrate holding section 22b and measurement of the thickness dimension of the substrate WB held on the holding section 23c are performed by the measurement unit 31.

For example, movement in the X direction of the panel alignment unit 20 (the substrate WA and the substrate WB) is performed by the drive unit 13, movement in the Y direction of the measurement unit 31 is performed by the moving unit 33, and the thickness dimensions of the substrate WA and the substrate WB are measured by the measurement unit 31.

In addition, in a state in which the substrate WA and the substrate WB are horizontal, when a variation in a thickness dimension is large, a plurality of places of the substrate having a large variation in the thickness dimension may be measured and their average value may be used as a measurement result.

Next, in step S4, the substrate holding section 22b is turned (the substrate WA is inverted).

For example, the substrate holding section 22b is turned by the turning section 22a and the substrate holding section 22b is supported by the support section 22d via the adjustment section 22d1.

Here, a support position of the substrate holding section 22b is adjusted by the adjustment section 22d1 such that the placing surface 22b1 of the substrate holding section 22b after the turning is parallel to an upper surface of the holding section 23c.

Next, in step S5, the position of the substrate holding section 22b after the turning is maintained.

For example, the substrate holding section 22b after the turning is pressed by the pressing section 25, and cooperates with the support section 22d to maintain the position of the substrate holding section 22b after the turning.

Here, a load applied to the turning section 22a can be reduced by the floating section 22e. In addition, the adjustment section 22d1 and the substrate placing section 23 can be adhered.

Next, in step S6, the position of the substrate WA is detected.

For example, movement in the X direction of the panel alignment unit 20 (the substrate WA) by the drive unit 13 is performed, movement in the Y direction of the imaging unit 32 by the moving unit 33 is performed, and the recognition section formed on the substrate WA is imaged by the imaging unit 32.

In addition, the imaging by the imaging unit 32 is performed via the hole section 22b2 formed in the substrate holding section 22b.

Next, in step S7, a positional deviation amount between the substrate WA and the substrate WB is calculated.

For example, the positional deviation amount between the substrate WA and the substrate WB is calculated from the position information of the substrate WB detected in step S3 and the position information of the substrate WA detected in step S6. In addition, when the positional deviation value exceeds a predetermined value, at least one of the substrate WA and the substrate WB is reset.

On the substrate holding section 22b and the holding section 23c, a positioning apparatus (not shown) configured to position the substrates WA and WB using one side of the exterior thereof as a reference can be provided such that the positions of the substrates WA and WB are within a predetermined range. Then, re-positioning can be performed by the positioning apparatus (not shown).

Next, in step S8, correction of the positional deviation amount is performed.

For example, positions in the X direction, Y direction, Z direction and θ direction (rotation direction) of the holding section 23c are adjusted by the position control unit 23a via the elevation section 23b. That is, the position of the substrate WB is matched with the position of the substrate WA.

Next, in step S9, the substrate WA and the substrate WB are adhered.

For example, the holding section 23c is raised by the elevation section 23b to attach the substrate WA and the substrate WB.

When an apex section of the adhesive agent B having a droplet shape on a surface of the substrate WA comes in contact with the substrate WB, the adhesive agent B having the droplet shape is spread to form the adhesive layer B1.

Here, when the thickness dimension of the adhesive layer B1 provided between the substrate WA and the substrate WB is varied, quality of the display device may be varied.

For this reason, the raising position (a position in the Z direction) of the holding section 23c is controlled such that the thickness dimension of the adhesive layer B1 is within a predetermined range.

For example, it will be appreciated that the position in the Z direction of the placing surface 22b1 of the substrate holding section 22b and the position in the Z direction of the holding section 23c are previously measured.

In addition, it will be appreciated that the thickness dimensions of the substrate WA and the substrate WB are measured in step S3.

For this reason, the raising position of the holding section 23c, which may be a desired thickness dimension of the adhesive layer B1, can be calculated from these values. That is, the raising amount can be calculated by the elevation section 23b.

In addition, these calculations can be calculated by the control unit 40. Then, based on the calculated raising amount, the elevation section 23b is controlled by the control unit 40 such that the thickness dimension of the adhesive layer B1 is within a predetermined range.

Here, when the substrate WA and the substrate WB are adhered, a force in a direction of raising the substrate holding section 22b after the turning is generated. When the position of the substrate holding section 22b is varied by the force, accuracy of the thickness dimension of the adhesive layer B1 is degraded.

However, in the apparatus 1 for manufacturing the display device according to the embodiment, since the pressing section 25 and the support section 22d cooperate to maintain the position of the substrate holding section 22b after the turning, accuracy of the thickness dimension of the adhesive layer B1 is not degraded.

In addition, since the above-mentioned adjustment section 22d1 or the floating section 22e is provided, the placing surface 22b1 of the substrate holding section 22b after the turning is parallel to the upper surface of the holding section 23c. That is, the substrate WA and the substrate WB are parallel to each other.

For this reason, a variation in surface of the thickness dimension of the adhesive layer B1 can also be suppressed.

Next, in step S10, a partial region of the adhesive layer B1 is cured.

That is, the substrate WA and the substrate WB are temporarily stopped.

For example, the ultraviolet rays are radiated to a partial region of the adhesive layer B1 formed between the substrate WA and the substrate WB by the radiation sections 26.

In this case, movement in the X direction of the panel alignment unit 20 (the substrate WA and the substrate WB) is performed by the drive unit 13, movement in the Y direction of the radiation head 26a is performed by the moving unit 26b, and the ultraviolet rays are radiated toward the adhesive layer B1 via the hole section 22b2 formed in the substrate holding section 22b.

Here, the ultraviolet rays are radiated around circumferential edges of the substrate WA and the substrate WB.

As the adhesive layer B1 around the circumferential edges of the substrate WA and the substrate WB is partially cured, the thickness dimension of the adhesive layer B1 can be maintained.

The substrate WA and the substrate WB that cure the partial region of the adhesive layer B1 are extracted from the apparatus 1 for manufacturing the display device, and the entire region of the adhesive layer B1 is cured by the ultraviolet ray radiation apparatus or the like.

That is, the method of manufacturing the display device according to the embodiment may include the following processes:

a process of turning the substrate holding section 22b that holds the substrate WA such that the substrate WA and the substrate WB held on the holding section 23c face each other; and a process of elevating the holding section 23c and attaching the substrate WA and the substrate WB via the adhesive layer B1.

Then, in the process of turning the substrate holding section 22b that holds the substrate WA such that the substrate WA and the substrate WB held on the holding section 23c face each other, the placing surface 22b1 of the substrate holding section 22b after the turning is parallel to the upper surface of the holding section 23c by the adjustment section 22d1 provided at the upper end of the support section 22d that supports the substrate holding section 22b after the turning and configured to adjust a distance between the substrate holding section 22b after the turning and the upper end of the support section 22d.

In addition, the method may further include a process of pressing the substrate holding section 22b after the turning toward the support section 22d by the pressing section 25.

Further, when the adhesive layer B1 includes an ultraviolet ray curing resin, the method may further include a process of radiating the ultraviolet rays to a partial region of the adhesive layer B1.

According to the embodiment as described above, the apparatus for manufacturing the display device and the method of manufacturing the display device that are capable of improving accuracy of the thickness dimension of the adhesive layer B1 can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An apparatus for manufacturing a display device, comprising:
    a first holding section configured to hold a first substrate;
    a second holding section configured to hold a second substrate;
    a turning section configured to turn the first holding section such that the first substrate and the second substrate face each other;
    a support section configured to support the first holding section after the turning;
    an adjustment section provided at one end of the support section and configured to adjust a distance between the first holding section after the turning and the one end of the support section;
    an elevation section configured to elevate the second holding section and attach the first substrate and the second substrate via an adhesive layer; and
    a floating section provided between the turning section and a first turning shaft, the floating section being configured such that the first holding section is displaceable with respect to the first turning shaft via the turning section, the floating section including a shaft section, a plate section, and at least one elastic section, the shaft section being a section of a second shaft and being provided on the first turning shaft of the turning section, the shaft section being inserted through one end side of the plate section, another end side of the plate section being provided on the first holding section, and the at least one elastic section is provided at a position between an end portion of the shaft section and one end side of the plate section along the shaft section.

2. The apparatus according to claim 1, further comprising a pressing section figured to press the first holding section after the turning toward the support section.

3. The apparatus according to claim 2, wherein the pressing section has a claw configured to press the first holding section.

4. The apparatus according to claim 2, wherein the support section and the pressing section cooperate to maintain a position of the first holding section after the turning.

5. The apparatus according to claim 1, wherein the support section is provided in plural, and
    the plurality of support sections are provided near four corners of the first holding section after the turning.

6. The apparatus according to claim 1, wherein the adjustment section has at least one of a screw mechanism provided at the one end of the support section and a spacer provided at the one end of the support section.

7. The apparatus according to claim 1, wherein
    the at least one elastic section includes a set of elastic sections provided to sandwich the plate section.

8. The apparatus according to claim 7, wherein the plate section is movable along the shaft section.

9. The apparatus according to claim 1, further comprising:
    a measurement detector configured to measure a thickness dimension of the first substrate held on the first holding section and a thickness dimension of the second substrate held on the second holding section; and
    a controller configured to control the elevation section such that the thickness dimension of the adhesive layer is within a predetermined range based on the thickness dimension of the first substrate and the thickness dimension of the second substrate.

10. The apparatus according to claim 1, wherein the adhesive layer comprises an ultraviolet ray curing resin, further comprising a radiation section configured to radiate ultraviolet rays to a partial region of the adhesive layer.

11. The apparatus according to claim 10, wherein the radiation section radiates the ultraviolet rays to the partial region of the adhesive layer via a hole section formed in the first holding section.

12. The apparatus according to claim 1, further comprising a position controller configured to perform position control of the second holding section.

13. The apparatus according to claim 12, further comprising an imager configured to image recognition sections formed on the first substrate and the second substrate,
wherein the position controller performs the position control on the second holding section based on information from the imager.

* * * * *